United States Patent
Onodera et al.

(10) Patent No.: US 6,894,868 B2
(45) Date of Patent: May 17, 2005

(54) MAGNETIC HEAD

(75) Inventors: Osamu Onodera, Saitama (JP); Heikichi Sato, Miyagi (JP); Katsumi Sakata, Miyagi (JP); Kaoru Aoki, Miyagi (JP)

(73) Assignee: Sony Corporation, Tokyo (JP)

( * ) Notice: Subject to any disclaimer, the term of this patent is extended or adjusted under 35 U.S.C. 154(b) by 61 days.

(21) Appl. No.: 10/381,288

(22) PCT Filed: Jul. 23, 2002

(86) PCT No.: PCT/JP02/07444

§ 371 (c)(1),
(2), (4) Date: Aug. 28, 2003

(87) PCT Pub. No.: WO03/010759

PCT Pub. Date: Feb. 6, 2003

(65) Prior Publication Data

US 2004/0100726 A1 May 27, 2004

(30) Foreign Application Priority Data

Jul. 23, 2001 (JP) ..................... 2001-221996

(51) Int. Cl.$^7$ ............... G11B 5/23; G11B 5/187
(52) U.S. Cl. .................. 360/119; 360/122
(58) Field of Search .................. 360/119, 120, 360/122, 126

(56) References Cited

U.S. PATENT DOCUMENTS 5,227,940 A * 7/1993 Isomura et al. ......... 360/126
5,594,608 A * 1/1997 Dee ..................... 360/126
5,708,544 A * 1/1998 Kawashima et al. ..... 360/119
5,905,612 A * 5/1999 Honma et al. .......... 360/119

FOREIGN PATENT DOCUMENTS

| JP | 11-161910 | 6/1999 |
| JP | 2000-20910 | 1/2000 |
| JP | 2001-28105 | 1/2001 |

* cited by examiner

Primary Examiner—Robert S. Tupper
(74) Attorney, Agent, or Firm—Sonnenschein, Nath & Rosenthal LLP (57) ABSTRACT

A magnetic head having a sliding surface (120) on which a magnetic recording medium is slid, a magnetic gap g formed in the sliding surface for exchanging information signals with the magnetic recording medium, a track width controlling portion for prescribing a track width Tw of the magnetic gap g, with the track width controlling portion being formed by abutting a pair of magnetic core halves (110a, 110b) together, there being track width controlling grooves (111a to 111d) formed in each of the magnetic core halves, metal magnetic films (112a to 112f) provided in association with the magnetic gap g and with the track width controlling portion, and a groove (130) formed in at least one end of the magnetic gap g for extending substantially parallel to the sliding direction of the magnetic recording medium. A length L in μm between a first point of intersection P between the track width controlling groove (111b) formed in one of the magnetic core halves (110a) and one lateral edge of the groove (130) and a second point of intersection Q between the magnetic gap g and the other lateral edge of the groove is related with an intensity of the recording current I [mA] by L≧11.3×1nI−21.9. With the magnetic head, demagnetization produced in the recording track of the magnetic tape is prevented from being produced.

3 Claims, 5 Drawing Sheets

MAGNETIC HEAD

BACKGROUND OF THE INVENTION

This invention relates to a magnetic head used for recording and/or reproducing information signals, such as audio or video signals, for a magnetic recording medium, such as a magnetic tape, or data signals, handled in an information processing unit, such as a personal computer.

Up to now, a metal-in-gap (MIG) type magnetic head has been used as a magnetic head for exchanging the information with a magnetic recording medium, such as a magnetic tape.

The MIG type magnetic head is formed by abutting and bonding a pair of magnetic core halves, formed of ferrites, to each other. With this magnetic head, a magnetic gap is formed on abutment surfaces of the paired magnetic core halves abutted and bonded to each other. Two track width controlling grooves are formed in each of the paired magnetic core halves forming the magnetic head. These track width controlling grooves control the track width of the magnetic gap when the paired magnetic core halves are abutted and bonded together to form the magnetic gap. In the MIG type magnetic head, a magnetic metal film is formed in the magnetic gap and in the track width controlling grooves.

Towards one side, for example an overwrite side, of the magnetic gap of the MIG type magnetic head, lying towards a recording track previously formed by sequentially recording information signals on the magnetic tape, there is formed a groove extending parallel to the tape running direction. This groove is provided for preventing the so-called side erasure from occurrence. This side erasure is caused by the unneeded stray magnetic flux from being produced from a track edge corresponding to one end of the magnetic gap to disturb the pattern of the recording track recorded on the magnetic tape.

Figure 1:
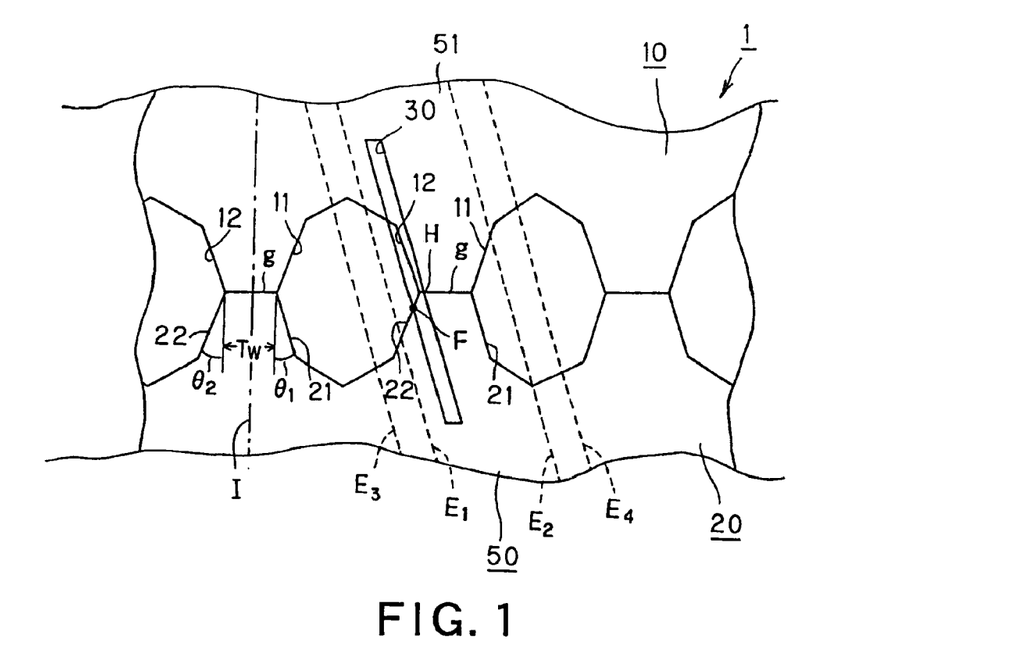
FIG. 1 is a plan view of a head block formed for producing a conventional magnetic head, looking from a magnetic tape sliding surface.

Referring to FIG. 1, a magnetic head, formed by abutting and bonding a pair of magnetic core halves to each other, is prepared by abutting a first magnetic core half 10 and a second magnetic core half 20 to form a head block 1, by applying preset machining operations to this head block 1 and by slicing the head block 1 into plural discrete magnetic heads.

FIG. 1 shows the head block 1 obtained on abutting the two paired, that is first and second magnetic core half blocks 10 and 20, and on machining the resulting product. The head block 1, shown in FIG. 1, is formed by abutting and bonding the first and second magnetic core half blocks 10 and 20, and is shown in a state prior to severing the block into discrete plural magnetic heads. FIG. 1 shows the head block, yet to be severed into discrete plural magnetic heads, looking from the tape sliding surface formed on each discrete magnetic head.

In the head block 1, formed on abutting the first and second magnetic core half blocks 10 and 20 to each other, there is formed as magnetic gap g in the abutment surface of the first and second magnetic core half blocks 10 and 20, as shown in FIG. 1.

In the first magnetic core half block 10, forming the head block 1, there are formed a first track width controlling groove 11 and a second track width controlling groove 12 for controlling the track width of the magnetic gap g. In the second magnetic core half block 20, there are similarly formed a first track width controlling groove 21 and a second track width controlling groove 22 for delimiting a track width Tw of the magnetic gap g along with the first and second track width controlling grooves 11, 12 formed in the first magnetic core half block 10.

The track width Tw of the magnetic gap g, formed in the head block 1, is controlled to high accuracy by the first and second track width controlling grooves 11, 12 and 21, 22 formed in the first and second magnetic core half blocks 10 and 20 abutted and bonded to each other, respectively. The reason is that the width of the abutment surfaces of the first and second magnetic core half blocks 10 and 20 delimiting the magnetic gap g is precisely controlled by the first and second track width controlling grooves 11, 12 and 21, 22 provided in the first and second magnetic core half blocks 10 and 20, respectively.

The head block 1 is sliced along first and second parallel slicing lines E3, E4 on both sides of the magnetic gap g to sever a magnetic head 50. The surface of the so severed magnetic head 50, in which is formed the magnetic gap g, serves as a sliding surface 51 on which slides the magnetic tape. The magnetic tape is run in sliding contact with a sliding area on the sliding surface 51, indicated by dotted lines E1 and E2 extending parallel to each other.

In the sliding surface 51 of the magnetic head 50, severed from the head block 1, there is formed a groove 30 for inhibiting side erasure. This groove is formed towards one end of the magnetic gap g for extending parallel to the tape running direction. The groove 30 is formed to affect a portion of one end of the magnetic gap g.

On both sides of the magnetic gap g of the magnetic head 50, severed from the head block 1, and in the first and second track width controlling grooves 11, 12, 21, 22, there are provided metal magnetic films. These metal magnetic films, provided to the magnetic head 50, form magnetic channels for the magnetic flux emanated from the magnetic head. In the groove 30 is charged e.g., glass.

With the magnetic head 50, including the groove 30 formed in the tape sliding surface, it is possible to prevent the stray magnetic flux from being emanated from the one end of the magnetic gap g provided with the groove 30, thereby preventing side erasure otherwise caused by the stray magnetic flux.

Meanwhile, a tape streamer, as a recording and/or reproducing apparatus for recording and/or reproducing data with the use of a magnetic tape as a recording medium and also with the use of a rotary magnetic head device, is used for providing backup of data handled in an information processing unit, such as a computer. Since this sort of the recording and/or reproducing apparatus handles a large quantity of data, the data transfer rate needs to be raised in order to record and/or reproduce data promptly. For increasing the transfer rate, the frequency of the recording current needs to be raised. If the frequency of the recording current is increased, the current intensity of the recording current needs to be increased in order to acquire a recording output of a predetermined level. That is, the intensity of an optimum current for a recording output differs from one frequency to another.

Figure 2:
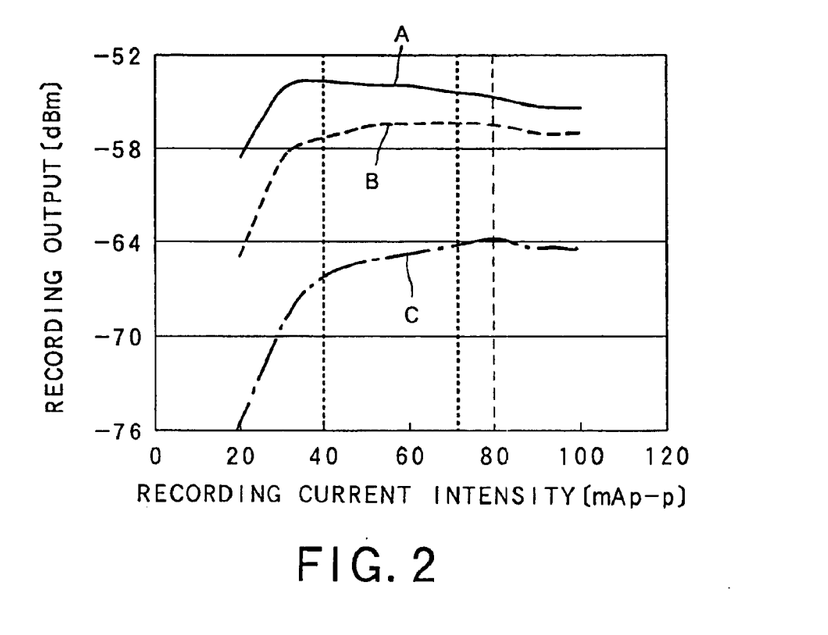
FIG. 2 is a graph showing the relationship between current values of plural recoding currents having different frequencies and recording output characteristics.

For example, if the frequency of the recording current is 28 MHz, the recording current to recording output characteristics, shown in FIG. 2A, are demonstrated, with the optimum current value for a recording output being approximately 40 mAp-p. If the frequency of the recording current is 42 MHz, the recording current to recording output characteristics, shown in FIG. 2B, are demonstrated, with the optimum current value for a recording output being approximately 70 mAp-p and, if the frequency of the recording current is 56 MHz, the recording current to recording output characteristics as shown in FIG. 2C are demonstrated, with the optimum current value for a recording output being approximately 80 mAp-p.

With the magnetic head 50, used here, the depth length of the magnetic gap g is 10 μm.

That is, for increasing the frequency of the recording current and for recording data at a high transfer rate with optimum recording characteristics, it is necessary to use a large recording current.

On the other hand, in the recording and/or reproducing apparatus used for recording data handled in an information processing apparatus, it is a requirement to improve reliability as an apparatus as well as durability. In order to meet these requirements, the magnetic head used needs to be improved in durability. For improving the durability of the magnetic head, it is necessary to improve the abrasion resistance of the sliding surface, adapted for having sliding contact with the magnetic tape, and to enlarge the depth length of the magnetic gap g.

If the depth length of the magnetic gap g of the magnetic head is increased, the intensity of the recording current needs to be increased.

Figure 3:
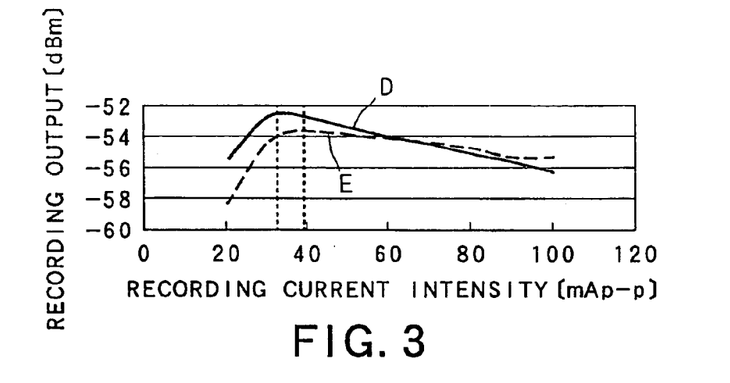
FIG. 3 is a graph showing the relationship between current values of the recording current, with the frequency of 28 MHz, and the recording output characteristics, for different depths of the magnetic gap.
Figure 4:
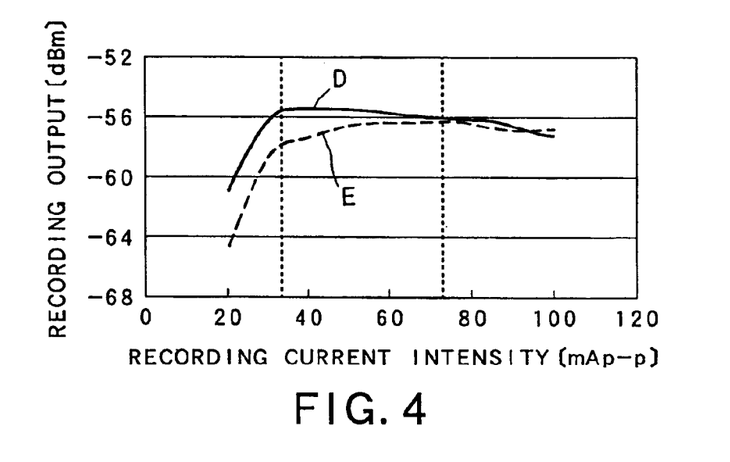
FIG. 4 is a graph showing the relationship between current values of the recording current, with the frequency of 42 MHz, and the recording output characteristics, for different depths of the magnetic gap.
Figure 5:
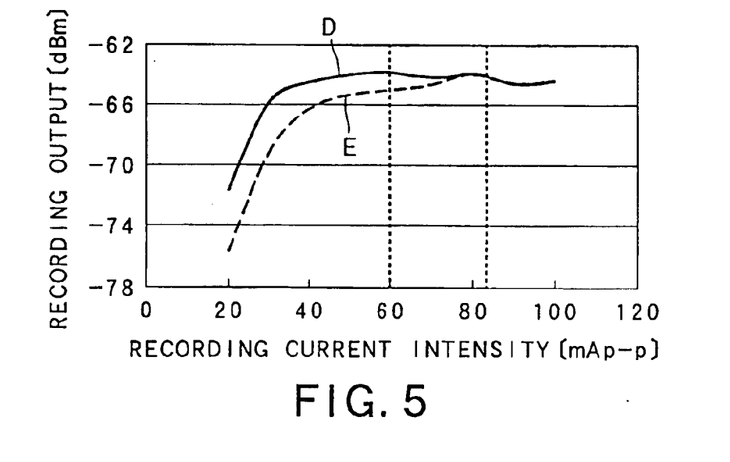
FIG. 5 is a graph showing the relationship between current values of the recording current, with the frequency of 56 MHz, and the recording output characteristics, for different depths of the magnetic gap.

FIGS. 3, 4 and 5 show the recording current—recording output characteristics in case the frequency of the recording current is set to 28 MHz, 42 MHz and to 56 MHz, respectively, with the depth length of the magnetic gap g being 4 μm and 10 μm, respectively. In FIGS. 3 to 5, the recording current—recording output characteristics for the depth length of the magnetic gap g of 4 μm and 10 μm are denoted as D and E, respectively.

When data is recorded using the recording current with the frequency of 28 MHz, the magnetic head with the depth length of 4 μm exhibits characteristics shown in FIG. 3D, with the recording output optimizing current intensity being approximately 35 mAp-p, while the magnetic head with the depth length of 10 μm shows characteristics shown in FIG. 3E, with the recording output optimizing current intensity being approximately 40 mAp-p.

When data is recorded using the recording current with the frequency of 42 MHz, the magnetic head with the depth length of 4 μm shows characteristics shown in FIG. 4D, with the recording output optimizing current intensity being approximately 35 mAp-p, while the magnetic head with the depth length of 10 μm shows characteristics shown in FIG. 4E, with the recording output optimizing current intensity being approximately 70 mAp-p.

When data is recorded using the recording current with the frequency of 56 MHz, the magnetic head with the depth length of 4 μm shows characteristics shown in FIG. 5D, with the recording output optimizing current intensity being approximately 60 mAp-p, while the magnetic head with the depth length of 10 μm shows characteristics shown in FIG. 5E, with the recording output optimizing current intensity being approximately 80 mAp-p.

If, in the magnetic head, the depth length of the magnetic gap g is increased, the recording output optimizing current intensity is increased. In particular, when the frequency of the recording current is increased, the recording output optimizing current intensity is increased further.

With the discrete magnetic head 50, severed from the head block 1, shown in FIG. 1, the track width controlling groove 22 of the second magnetic core half block 20 intersects one lateral edge of the parallel groove 30 on the left side in FIG. 1 at a first point of intersection shown in FIG. 1. The metal magnetic film, forming the magnetic path as described above, is deposited in the track width controlling groove 22 lying at this first point of intersection F. It is noted that the unneeded stray magnetic flux is produced at and near this first point of intersection F, with the stray magnetic flux increasing with the intensity of the recording current.

When the recording track of the magnetic tape, on which the information signals have already been recorded in the magnetic gap g, traverses the first point of intersection F and its vicinity, demagnetization is produced under the influence of the stray magnetic flux emanated from the first point of intersection F and its vicinity. That is, demagnetization is produced in which the information signals already recorded in the recording track in the magnetic gap g are partially erased under the effect of the stray magnetic flux.

In particular, with the magnetic head in which the transfer rate of data to be recorded on the magnetic tape is increased or in which the depth length of the magnetic gap g is increased to improve durability, the intensity of the recording current needs to be increased, as described above. If the intensity of the recording current I is increased, the stray magnetic flux emanating from the first point of intersection and its vicinity is also increased. For example, if the intensity of the recording current I exceeds 50 mA, the noise level is increased due to demagnetization in which the information signals already recorded on the magnetic tape are partially erased by the stray magnetic flux emanating from the first point of intersection F and its vicinity, so that information signals cannot be recorded with optimum recording characteristics.

SUMMARY OF THE INVENTION

It is therefore an object of the present invention to overcome the aforementioned problems and to provide a magnetic head by means of which information signals can be recorded with an optimum S/N ratio.

It is another object of the present invention to provide a magnetic head by means of which the transfer rate of the information signals to be recorded is raised to enable efficient recording of information signals.

It is yet another object of the present invention to provide a magnetic head in which durability may be improved and which can be used for prolonged time.

The present invention provides a magnetic head including a sliding surface on which a magnetic recording medium is slid, a magnetic gap formed in the sliding surface for exchanging information signals with the magnetic recording medium, a track width controlling portion for prescribing a track width of the magnetic gap, the track width controlling portion being formed by abutting a pair of magnetic core halves, there being a track width controlling groove formed in each of the magnetic core halves, a metal magnetic film provided in association with the magnetic gap and the track width controlling portion, and a groove formed in at least one end of the magnetic gap for extending substantially parallel to the sliding direction of the magnetic recording medium. A length L in μm between a first point of intersection between the track width controlling groove formed in one of the magnetic core halves and one lateral edge of the groove and a second point of intersection between the magnetic gap and the other lateral edge of the groove is related with an intensity of the recording current I [mA] by $$L \geq 11.3 \times \ln L - 21.9.$$

By setting the length L in μm between a first point of intersection between the track width controlling groove formed in one of the magnetic core halves and one lateral edge of the groove and a second point of intersection between the magnetic gap and the other lateral edge of the groove, that is the distance between the metal films lying on both sides of the groove, as described above, it is possible to prevent the demagnetization otherwise produced in the recording track of the magnetic tape to maintain optimum recording characteristics.

By setting the intensity of the recording current I of the information signals to 100 mA or less, it is possible to suppress the effect of the recording current on the reproducing magnetic head, even though the reproducing magnetic head for reproducing the information signals recorded by this recording head is mounted in close proximity to the recording head. Thus, the magnetic head may be applied with advantage to a rotary magnetic head device of the type adapted for verifying the state of recording of the recorded signals.

According to the present invention, the plural substantially straight lines, formed on the sliding surface by a plurality of track width controlling grooves formed in one of the magnetic core halves, are arranged non-symmetrically relative to an imaginary line extending perpendicular to the magnetic gap. With this magnetic head, it is possible to provide a distance larger than a predetermined value between the point of intersection of the track width controlling groove of at least one magnetic core half and the side erasure prohibiting groove and the point of intersection of one end of the magnetic gap g and the side erasure prohibiting groove to prevent these points of intersection from being arranged close to each other.

Other objects, features and advantages of the present invention will become more apparent from reading the embodiments of the present invention as shown in the drawings.

DETAILED DESCRIPTION OF THE PRESENTLY PREFERRED EMBODIENT

A magnetic head according to the present invention is now explained with reference to several embodiments of the invention shown in the drawings.

The magnetic head according to the present invention is used in a tape streamer magnetic head device which is a recording and/or reproducing apparatus used for providing backup of data handled in an information processing apparatus, such as a computer. In this recording and/or reproducing apparatus, a plural number of magnetic heads are mounted on a rotary drum, on which the magnetic tape is wound, and the magnetic tape running on the peripheral surface of the rotary drum is brought into sliding contact with the magnetic head which is run in rotation by being mounted on the rotary drum, thereby recording information signals, such as data, or reproducing the information signals recorded on the magnetic tape.

The tape streamer, for which the magnetic head of the present invention is used, is of the so-called read-after-write type, in which data recording is made by a recording magnetic head as data already recorded by the recording magnetic head is reproduced by a reproducing magnetic head, provided in rear of the recording magnetic head, to check the data recording state. In a rotary magnetic head device of the system described above has one or more recording magnetic heads and one or more reproducing magnetic heads are mounted alternately on the rotary drum. For example, plural recording magnetic heads for recording and plural reproducing magnetic heads are alternately mounted at equi-angular intervals of, for example, 45°, along the circumference of the rotary drum.

The rotary drum has a diameter of 40 mm. The distance between magnetic gaps of the recording magnetic head and the reproducing magnetic head, mounted at an equiangular interval of 45° on the rotary drum of the above size is approximately 15.3 mm.

Figure 6:
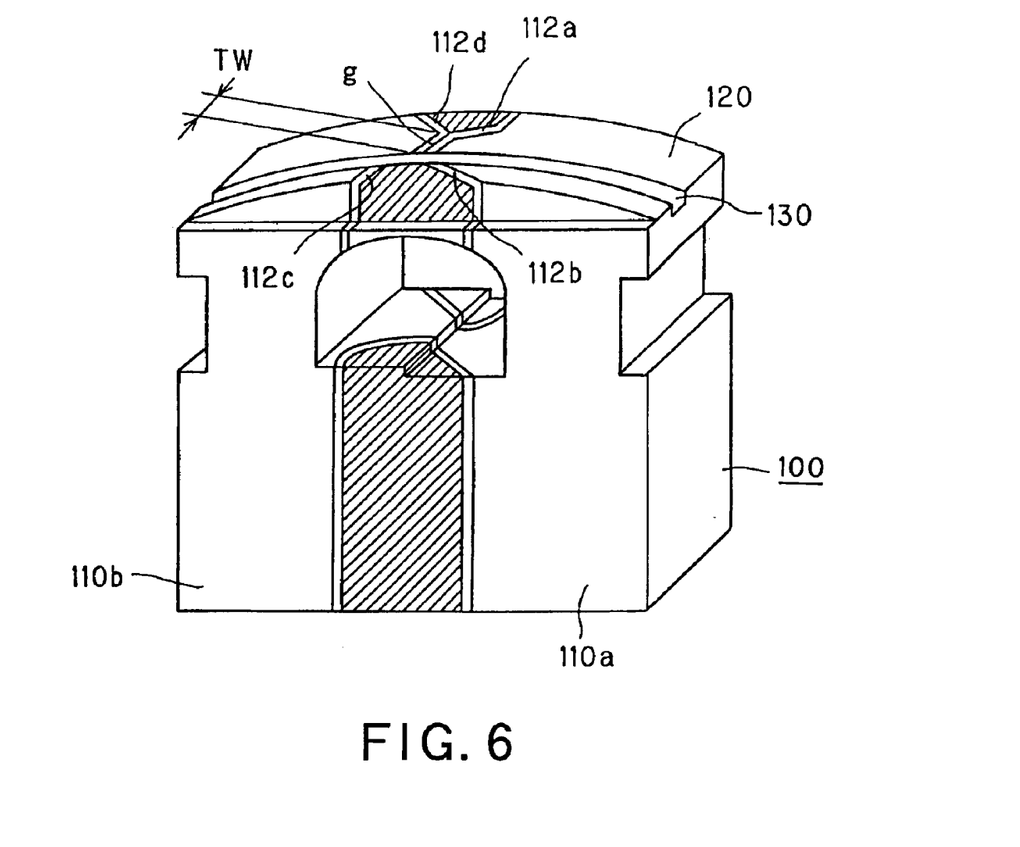
FIG. 6 is a perspective view showing a magnetic head according to the present invention.

A magnetic head 100 of the present invention, used in this rotary type magnetic head device, is designed as a MIG (metal-in-gap) type magnetic head, as shown in FIG. 6.

The MIG type magnetic head 100, according to the present invention, is formed by abutting and bonding paired first and second magnetic core halves 110a, 110b, formed of ferrite, to each other. With this magnetic head 100, a magnetic gap g is formed on abutment surfaces of the paired first and second magnetic core halves 110a, 110b, abutted and bonded to each other, with the interposition of a gap material, not shown. An upper surface of the magnetic head in FIG. 6, to which faces the magnetic gap g, acts as a tape sliding surface 120, on which slides the magnetic tape as a magnetic recording medium. The center portion of the tape sliding surface 120, in which is formed the magnetic gap g, is swollen outwards to a substantially arcuate surface which is curved along the tape running direction.

The magnetic gap g facing the tape sliding surface 120 has a preset track width Tw determining the width of a recording track formed by recording the information signals on the magnetic tape. The track width Tw of the magnetic gap g is controlled by the track with controlling grooves, which are provided in the first and second magnetic core halves 110a, 110b, which are abutted together to form the magnetic head 100, in a manner which will be explained subsequently.

Figure 7:
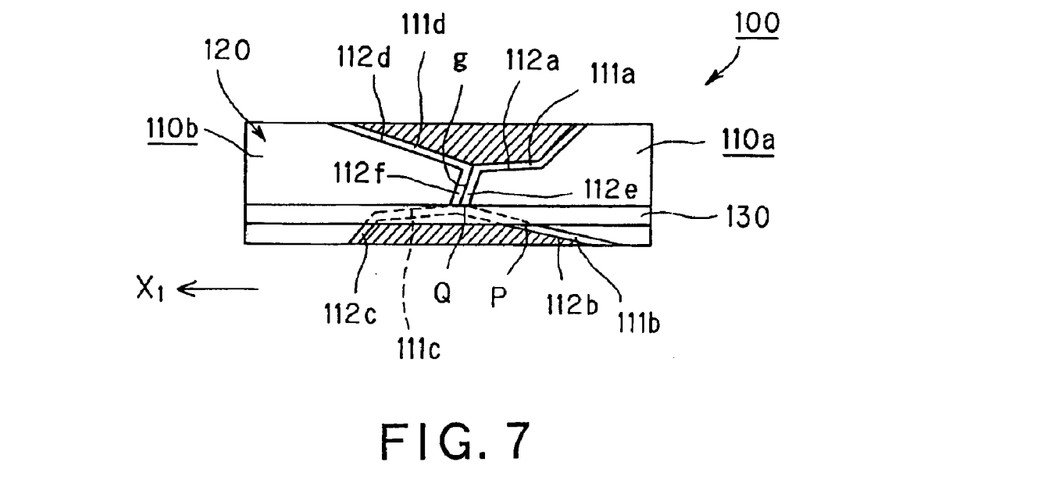
FIG. 7 is a perspective view of the magnetic head according to the present invention, looking from the sliding surface of the magnetic tape.

Referring to FIG. 7, first to fourth track width controlling grooves 111a, 111b, 111c and 111d are formed in the first magnetic half 110a and the second magnetic half 110b abutted to each other to form the magnetic head 100. It is noted that the third track width controlling groove 111c formed in the second magnetic core half 110b is shown with a dotted line in FIG. 7 because the groove is formed within a trimming groove 130 which will be explained subsequently.

On the bottom surfaces of the first to fourth track width controlling grooves 111a, 111b, 111c and 111d, are provided in the first and second magnetic core halves 110a, 110b, there are deposited metal magnetic films 112a, 112b, 112c and 112d, respectively. These metal magnetic films 112a, 112b, 112c and 112d are deposited by forming films of magnetic metal as by sputtering.

On the abutment surfaces of the first and second magnetic core halves 110a, 110b, abutted to each other to form the magnetic gap g, there are provided metal magnetic films 112e, 112f. These metal magnetic films 112e, 112f are formed by forming films of magnetic metal, such as by sputtering, simultaneously with the magnetic metal films 112a to 112d provided in the first to fourth track width controlling grooves 111a to 111d.

The metal magnetic films 112e, 112f are formed on the abutment surfaces delimiting the magnetic gap g, so that, more correctly, the track width Tw of the magnetic gap g is defined by the metal magnetic films 112e, 112f formed in the abutment surfaces and by the magnetic metal films 112a to 112d provided in the first to fourth track width controlling grooves 111a to 111d.

The magnetic metal films 112a to 112d provided in the first to fourth track width controlling grooves 111a to 111d and the metal magnetic films 112e, 112f provided on the abutment surfaces of the first to fourth track width controlling grooves 111a to 111d are e.g., metal magnetic films of high magnetic permeability, formed of a ferromagnetic metal material, and form a magnetic path along the longitudinal direction of the MIG magnetic head 100 of the present invention, as shown in FIG. 6, to record information signals on a magnetic tape or to reproduce the information signals recorded on the magnetic tape.

In the tape sliding surface 120, in which the magnetic gap g is opened, and in which the track width Tw is delimited by the magnetic metal films 112a to 112, providing the magnetic path, there is formed a trimming groove 130, operating as a pre-mentioned prohibiting groove, as shown in FIG. 7. The trimming groove 130 is formed substantially parallel to the direction indicated by arrow $X_1$ in FIG. 7 corresponding to the running direction of the magnetic tape which is run in sliding contact with the tape sliding surface 120. This trimming groove 130 is formed at one end of the magnetic gap g, for example, on the overwrite side towards the recording track, on which the information signals have been recorded ahead of the magnetic tape, as shown in FIG. 7.

Since the trimming groove 130 is formed on the information signal overwrite side, it is possible to prevent unneeded stray magnetic flux from emanating from the track edge of the magnetic gap g in such a manner as to prevent side erasure which tends to disturb the recording pattern of the recording track formed by recording the information signals on the magnetic tape. With the magnetic head 100 of the present invention, a point of intersection P between the metal magnetic film 112b and the trimming groove 130 is formed, as shown in FIG. 7.

On the other hand, a point of intersection Q between the metal magnetic film 112e extending substantially parallel to the magnetic gap g of the first magnetic core half 110a and the trimming groove 130 is formed, as shown in FIG. 7.

In the magnetic head 100 according to the present invention, stray magnetic flux is generated at the point of intersection P between the metal magnetic film 112b provided in the track width controlling groove 111b and the trimming groove 130. It is necessary to inhibit this stray magnetic flux to lower the effect on the recording track in which the information signals have already been recorded.

The present inventors have found that, by controlling the distance L between the point of intersection P between the metal magnetic film 112b and the trimming groove 130 and the point of intersection Q between the metal magnetic film 112e and the trimming groove 130, depending on the intensity of the recording current I supplied to the magnetic head 100, it is possible to inhibit the effect of the stray magnetic flux generated at the point of intersection P.

That is, by controlling the distance between the points of intersection P, Q depending on the intensity of the recording current, the phenomenon of demagnetization, in which the pre-recorded signals on the magnetic tape are partially erased by the unneeded stray magnetic flux emanating from the metal magnetic film 112b at the point of intersection P, in case information signals are recorded on the magnetic tape with the magnetic head 100 according to the present invention.

Figure 8:
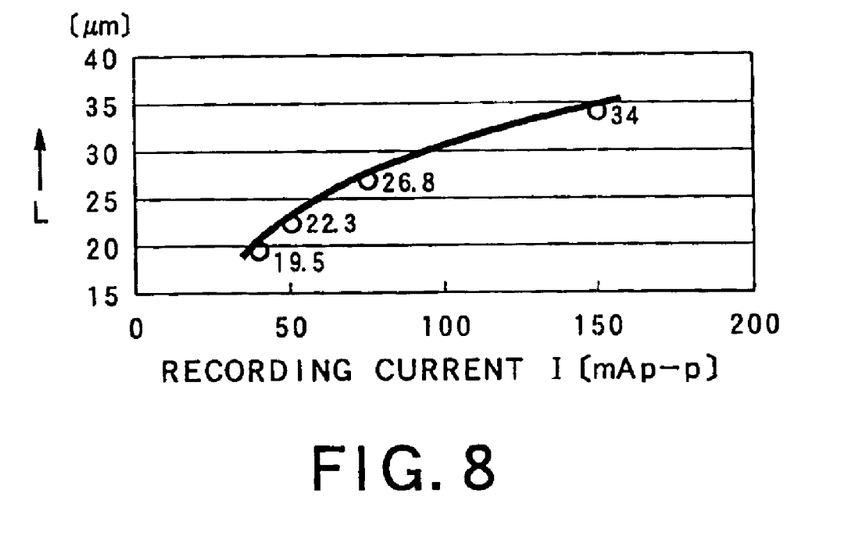
FIG. 8 is a graph showing the relationship between the intensity of the recording current I [mA] and the values of the distance L ($\mu$m) between intersection points P, Q for which the demagnetization phenomenon of recorded signals of the magnetic tape may be prohibited from occurring.

The present inventors have found the distance L ($\mu$m) for which the phenomenon of demagnetization of the pre-recorded signals on the magnetic tape by the unneeded stray magnetic flux emanated from the metal magnetic film 112b can be inhibited when the recording current I, that is the current 40 mAp-p, 50 map-p, 75 mAp-p and 150 mAp-p, is supplied to the magnetic head 100. Specifically, when the recording current I is 40 mAp-p, 50 mAp-p, 75 mAp-p and 150 mAp-p, the values of the distance L ($\mu$m) between the point of intersection P and the point of intersection Q are 19.5 $\mu$m, 22.3 $\mu$m, 26.8 $\mu$m and 34 $\mu$m, respectively. The relationship between the intensity of this recording current I [mA] and the distance L ($\mu$m) between the points of intersection P and Q, for which the phenomenon of demagnetization of the pre-recorded signals on the magnetic tape can be inhibited, is shown in FIG. 8.

It should be noted that the distance L ($\mu$m) between the points of intersection P and Q, for which the phenomenon of demagnetization of the pre-recorded signals on the magnetic tape can be inhibited, is determined by the intensity of the recording current I (mA) supplied, and is not affected by the frequency of the recording current I [mA] used.

From the relationship between the intensity of the recording current I [mA] and the distance L ($\mu$m) between the points of intersection P and Q, for which the phenomenon of demagnetization of the pre-recorded signals on the magnetic tape can be inhibited, the following relationship:

$$L \geq 11.3 \times \ln I - 21.9$$

is derived.

Figure 9:
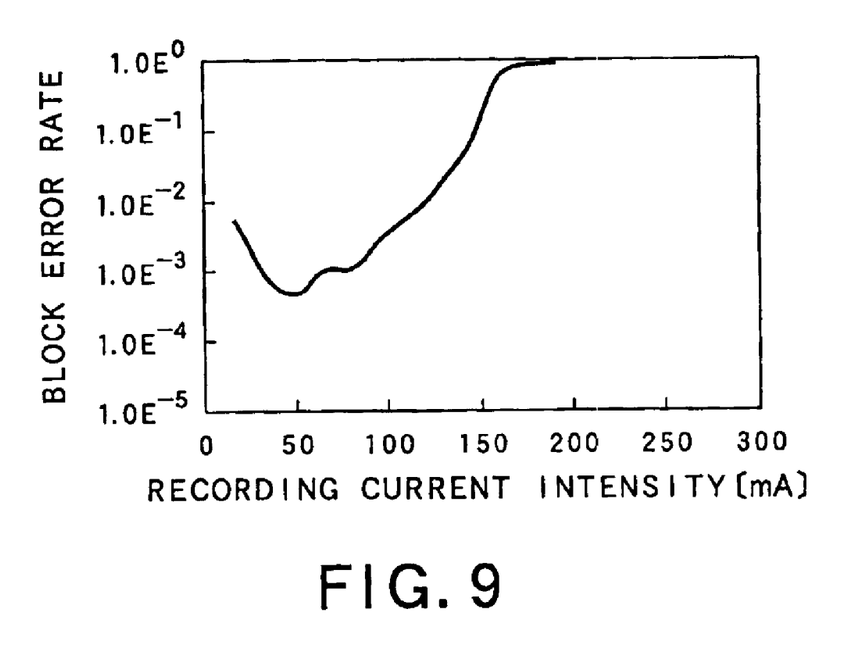
FIG. 9 is a graph showing the relationship between the recording current and the block error rate in case of overwriting.

An experiment was conducted for finding an error rate of errors per a preset unit number of bits, for example, 256 bits, when data handled on a computer using the magnetic head 100 is overwritten on the magnetic tape. The results of the experiment are shown in FIG. 9. The data overwrite on the magnetic tape means overwrite recording on data, already recorded on the magnetic tape prior to overwriting, without performing an independent erasure operation. The error rate means the probability that the data recorded on the magnetic tape prior to data overwrite is not completely erased but is left over. As shown in FIG. 9, the block error rate is optimum for the recording current I of 50 mAp-p and, when the recording current I is approximately 30 to 100 mAp-p, the block error rate may be reduced such that data can be recorded as an optimum S/N is maintained.

With the magnetic head 100 according to the present invention, the transfer rate of the information signals to be recorded may be raised, such that the information signals can be recorded efficiently. Thus, the magnetic head of the present invention can be used with advantage for a recording and/or reproducing apparatus employing the recording current of a high intensity, such as 50 to 100 mAp-p, for a higher frequency.

With the magnetic head 100 according to the present invention, the block error rate can be lowered and data can be recorded at an optimum S/N ratio, when the recording current is approximately 50 to 100 mAp-p, so that, even when the magnetic head of the present invention is applied to a recording and/or reproducing apparatus of the pre-mentioned read-after-write system, the data stored on the recording magnetic head can be read out accurately by the reproducing magnetic head without affecting the reproducing magnetic head. In particular, when the magnetic head is applied to a rotary magnetic head device in which recording magnetic heads and reproducing magnetic heads are arranged at an equiangular distance of 45° on a rotary drum 40 mm in diameter, with the distance between the magnetic gaps g being approximately 15.3 mm, it is possible to inhibit the effect the recording magnetic head has on the reproducing magnetic head to enable the data recorded by the recording magnetic head to be read out correctly by the reproducing magnetic head.

Meanwhile, in the conventional MIG magnetic head, a track width controlling groove 21 and a track width controlling groove 22 of the first magnetic core half block 20, corresponding to the first magnetic core half 110a of the MIG magnetic head 100 of the present invention, are arranged symmetrically with respect to an imaginary line I perpendicular to the magnetic gap g, as shown in FIG. 1 already explained.

That is, the track width controlling groove 21 and the track width controlling groove 22 are formed at an angle $\theta_1$ and at an angle of $\theta_2$, respectively, with respect to a parallel line to the imaginary line I, with the angles $\theta_1$ and $\theta_2$ both being e.g., 30°. Since the track width controlling groove 22 is formed in this manner, the contact point between the metal magnetic film formed in the track width controlling groove 22 and the parallel groove 30 is a point of intersection F, as shown in FIG. 1.

On the other hand, the contact point between the metal magnetic film of the magnetic core half block 20 of the magnetic gap g and the parallel groove 30 is a point of intersection H, as shown in FIG. 1. The length between the points of intersection F and H is appreciably shorter than the length between the points of intersection P and Q of the MIG magnetic head 100 of the present invention. The result is that pre-mentioned phenomenon of demagnetization by the unneeded stray magnetic field, generated in the metal magnetic film, is produced at the point of intersection F of FIG. 1, thus erasing a portion of the signals pre-recorded on the magnetic tape.

With the MIG magnetic head 100 according to the present invention, the phenomenon of demagnetization, such as is produced in the conventional magnetic head, in which part of the pre-recorded signals on the magnetic tape are erased, is not produced and can be suppressed effectively.

With the magnetic head 100 according to the present invention, the track width controlling groove 111b of the first magnetic core half 110a is formed at an angle of approximately 90° relative to a line parallel to the magnetic gap g, as shown in FIG. 7. Thus, when the metal magnetic film 112b is formed on the track width controlling groove 111b, such as by sputtering, the metal magnetic film 112b can be thinner than other portions, and hence the metal magnetic film 112b can be thinner at the pre-mentioned point of intersection P in FIG. 7 than other portions. Thus, it is possible to reduce the unneeded stray magnetic field at the point of intersection P to inhibit the phenomenon of demagnetization more effectively.

The hatched portions of FIGS. 6 and 7 are charged with a non-magnetic material, such as glass, while the trimming groove 130 is also charged with the nonmagnetic material, such as glass.

Figure 10:
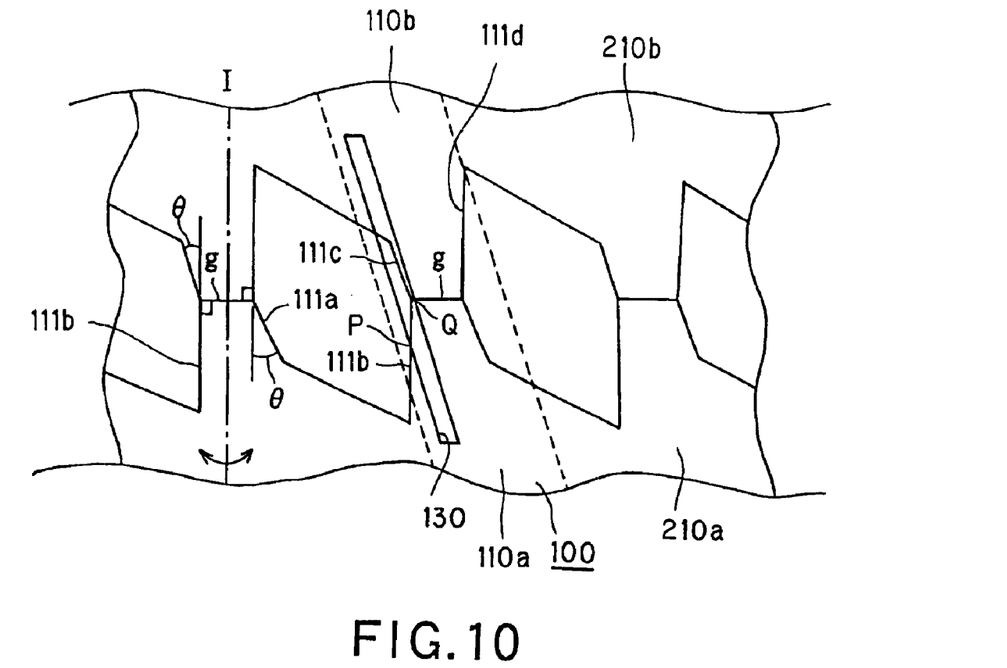
FIG. 10 shows a portion of a manufacturing process for forming a sliding surface of a magnetic head according to the present invention.

FIG. 10 shows a portion of the manufacturing process for forming the tape sliding surface 120 shown in FIG. 7.

FIG. 10 shows the state prior to separation into plural magnetic heads shown in FIG. 7. More specifically, first and second magnetic core halves 210a, 210b are abutted to each other to form a block of plural magnetic heads. This block can be severed into plural MIG magnetic heads 100 by slicing along cutting lines, not shown, lying outside dotted lines shown in FIG. 10, with the dotted line being an abutment width processing line prescribing the area of sliding contact with the magnetic tape. Since the first and second magnetic core halves 210a, 210b are each comprised of a side-by-side repetition of the same structures, only a portion of each of the magnetic core halves is hereinafter explained.

Referring to FIG. 10, in a portion of the magnetic core halves forming a sole MIG magnetic head 100, the abutting portions of the first magnetic core half block 210a and the second magnetic core half block 210b form the magnetic gap g with a metal magnetic film, not shown, in-between. The track width controlling grooves 111a, 111b are formed in the first magnetic core half block 210a. The track width controlling groove 111a is formed at an angle θ, for example, at an angle of 30°, as described above, relative to a line parallel to the imaginary line I, as shown in FIG. 10. The track width controlling groove 111b is arranged at approximately 90° with respect to the magnetic gap g. That is, the track width controlling groove 111a and so forth are arranged non-symmetrically relative to the imaginary line I. The track width controlling grooves 111c, 111d are formed in a manner similar to the manner in which the track width controlling grooves 111a, 111b are formed. The state of FIG. 10 is achieved by abutting the magnetic core half blocks to each other, using the second magnetic core half block 210b.

Meanwhile, the trimming groove 130 is formed in each magnetic gap g of FIG. 10. Thus, by abutting the magnetic core halves, non-symmetrical with respect to the imaginary line I, to each other, the distance between the points of intersection P and Q may be elongated to enable the production of the MIG magnetic head 100 unsusceptible to the phenomenon of demagnetization.

Figure 11:
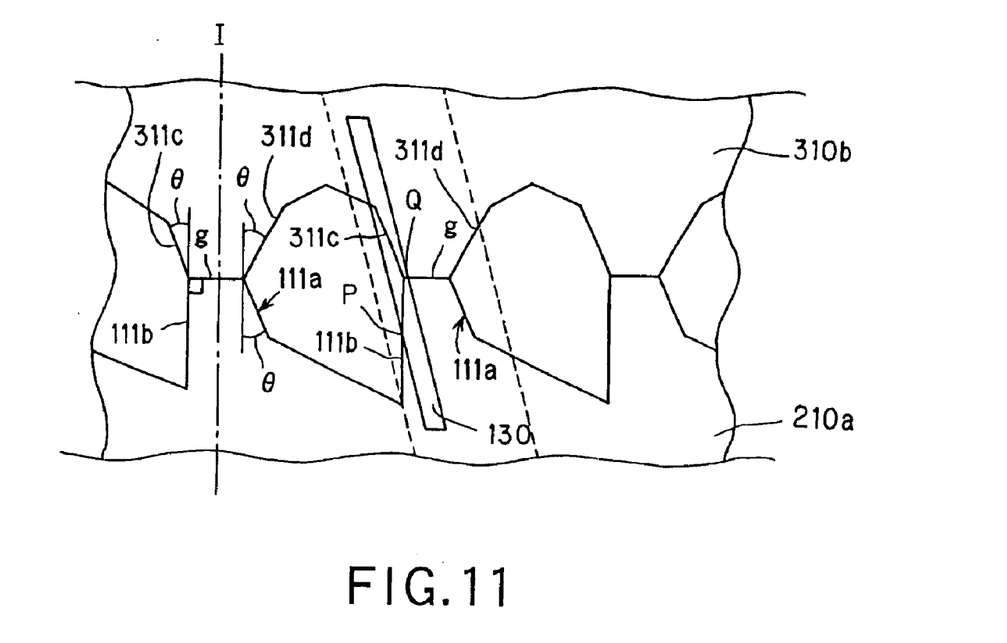
FIG. 11 is a schematic view showing a portion of a manufacturing process for a MIG type magnetic head according to a modification of the present invention.

The magnetic head 100 according to the present invention may be formed through the manufacturing process shown in FIG. 11.

Meanwhile, since FIG. 11 has many structural portions in common with FIG. 10, common structural portions are depicted by the same reference numerals and are not explained, while only the points of difference are mainly explained.

In FIG. 11, the track width controlling grooves 111a, 111b of the first magnetic core half block 210a shown on the lower side in FIG. 11 and the track width controlling grooves 311d, 311c of the second magnetic core half block 310b shown on the upper side in FIG. 11 are different, and hence the magnetic core half blocks are non-symmetrical.

In this configuration, the length between the points of intersection P and Q may be elongated. As a consequence, not only the phenomenon of demagnetization in which the information signals previously recorded on the magnetic tape are erased may be prevented from occurrence, but also the angle of the track width controlling grooves 311d, 311c on the upper side in the drawing unrelated with the phenomenon of demagnetization may be selectively set as more importance is attached to magnetic head characteristics.

For example, only the track width controlling groove 111b of the first magnetic core half block 210a is set to an angle of approximately 90° relative to the magnetic gap g, as shown in FIG. 11, while the angle θ of each of the remaining track width controlling grooves 111a, 311c, 311d may be set to the same value of, for example, 30°.

The present invention is not limited to the above-described embodiment, but may be optionally modified without changing its purport.

Industrial Applicability

With the present invention, described above, a magnetic head may be provided in which the recording current is increased and the transfer rate of the information signals to be recorded is raised to enable the information signals to be recorded efficiently. Moreover, the magnetic head is improved in durability and usable for prolonged time.

What is claimed is:

1. A magnetic head comprising a sliding surface on which a magnetic recording medium is slid, a magnetic gap formed in said sliding surface for exchanging information signals with said magnetic recording medium, a track width controlling portion for prescribing a track width of said magnetic gap, said track width controlling portion being formed by abutting a pair of magnetic core halves, there being a track width controlling groove formed in each of said magnetic core halves, a metal magnetic film provided in association with said magnetic gap and said track width controlling portion, and a groove formed in at least one end of said magnetic gap for extending substantially parallel to the sliding direction of said magnetic recording medium, wherein a length L in μm between a first point of intersection between said track width controlling groove formed in one of said magnetic core halves and one lateral edge of said groove and a second point of intersection between said magnetic gap and the other lateral edge of said groove is related with an intensity of the recording current I [mA] by $$L \geq 11.3 \times 1 n I - 21.9.$$

2. The magnetic head according to claim 1 wherein the recording current intensity I is 50 to 100 mAp-p.

3. The magnetic head according to claim 1 wherein a plurality of substantially straight lines formed on said sliding surface, by a plurality of said track width controlling grooves formed in one of said magnetic core halves, are arranged non-symmetrically relative to an imaginary line extending perpendicular to said magnetic gap.

* * * * *